United States Patent
Harada

[19]

[11] Patent Number: 5,870,947
[45] Date of Patent: Feb. 16, 1999

[54] APPARATUS FOR SUPPLYING PASTE FOOD SHEETS AT A PREDETERMINED INTERVAL

[75] Inventor: Masaru Harada, Kanagawa-ken, Japan

[73] Assignee: Kabushikikaisha Kibun Shokuhin, Tokyo, Japan

[21] Appl. No.: 800,280

[22] Filed: Feb. 13, 1997

[30] Foreign Application Priority Data

Apr. 24, 1996 [JP] Japan ................................. 8-127779

[51] Int. Cl.$^6$ ............................ A23L 1/00; A22C 25/00; A22C 25/02
[52] U.S. Cl. .................. 99/450.2; 99/450.7; 425/131.1; 425/319; 425/321; 425/462
[58] Field of Search ...................... 99/353, 450.1–450.8, 99/461, 443 C, 477; 425/289, 391, 319, 131.1, 131.3, 462, 133.1, 321, 322, 190, 310, 466, 467; 426/250, 383, 512–516, 540, 643; 264/209.2, 313, 314, 163

[56] References Cited

U.S. PATENT DOCUMENTS

| | | | |
|---|---|---|---|
| 3,873,742 | 3/1975 | Miyahara | 426/234 |
| 4,557,940 | 12/1985 | Suzuki | 425/319 X |
| 4,571,167 | 2/1986 | Goto et al. | 425/391 X |
| 4,670,276 | 6/1987 | Nakajima . | |
| 4,678,418 | 7/1987 | Thulin . | |
| 4,685,877 | 8/1987 | Harada | 264/163 X |
| 4,697,507 | 10/1987 | Nagasaki | 99/443 C |
| 4,746,525 | 5/1988 | Goto et al. | 425/321 X |
| 4,807,524 | 2/1989 | Ikeuchi et al. | 99/353 |
| 4,853,239 | 8/1989 | Suzuki et al. | 425/319 X |
| 4,859,239 | 8/1989 | Hoashi | 99/450.7 |
| 4,937,089 | 6/1990 | Ikoma et al. | 426/574 |
| 5,019,412 | 5/1991 | Hattori | 99/451 |
| 5,198,256 | 3/1993 | Yamada | 425/131.1 |
| 5,333,538 | 8/1994 | Sawa | 99/353 |

FOREIGN PATENT DOCUMENTS 6-14832  3/1994  Japan .

OTHER PUBLICATIONS

WPI Abstract Accession No. 90–137013/18 & JP94014832B2—see abstract, 1997.

*Primary Examiner*—Timothy F. Simone
*Attorney, Agent, or Firm*—Wenderoth, Lind & Ponack

[57] ABSTRACT

An apparatus supplies food paste material sheets at a predetermined interval on a surface moving at a predetermined speed. The apparatus includes a horizontally arranged first roller adapted to be rotated to receive a continuous food paste material sheet on the circumferential surface thereof; means for severing the continuous sheet on the circumferential surface at a predetermined interval in the circumferential direction into a plurality of sheet segments or the above-stated sheets; a first peeler means provided at a predetermined position on the lower half portion of the circumferential surface of the first roller for peeling off the severed sheet segments from the circumferential surface which segments have been successively brought to the above-noted predetermined position; and a second horizontally arranged roller provided under the first roller. The second roller is adapted to be rotated to sequentially receive the sheet segments from the first roller. The apparatus includes a second peeler means for peeling off the sheet segments from the second roller to supply them onto the above-noted moving surface. The second roller includes means provided on the circumferential surface thereof for receiving a leading portion of each of the sheet segments which has moved vertically down from the first roller so as to position and hold the leading portion.

6 Claims, 7 Drawing Sheets

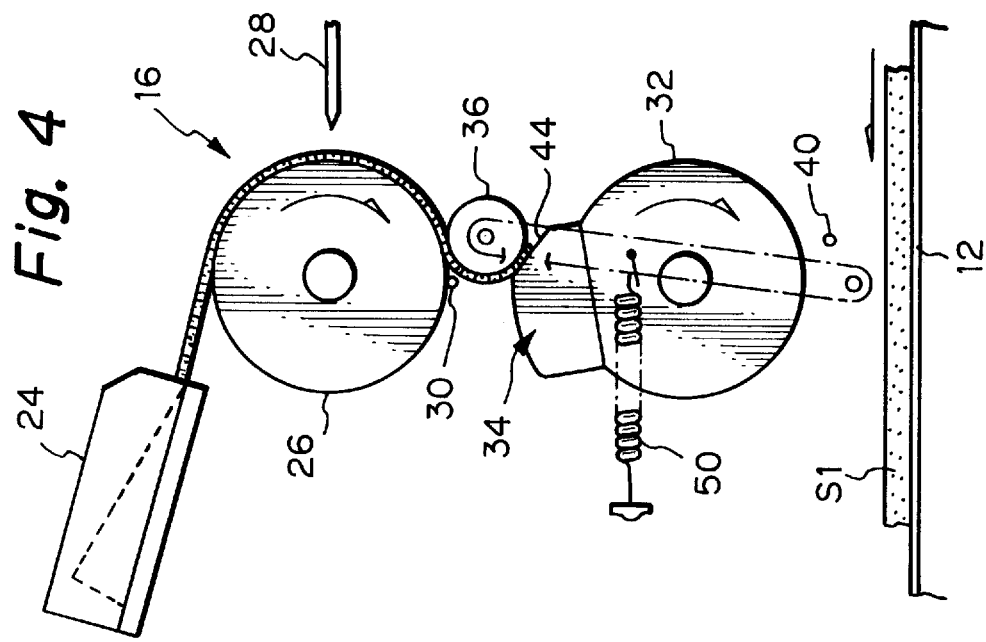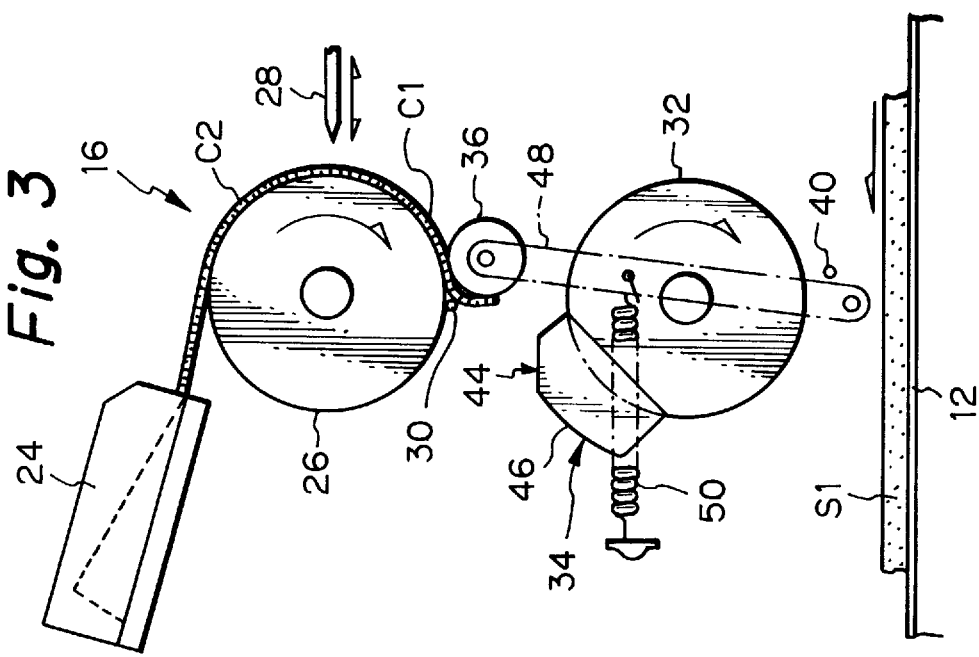

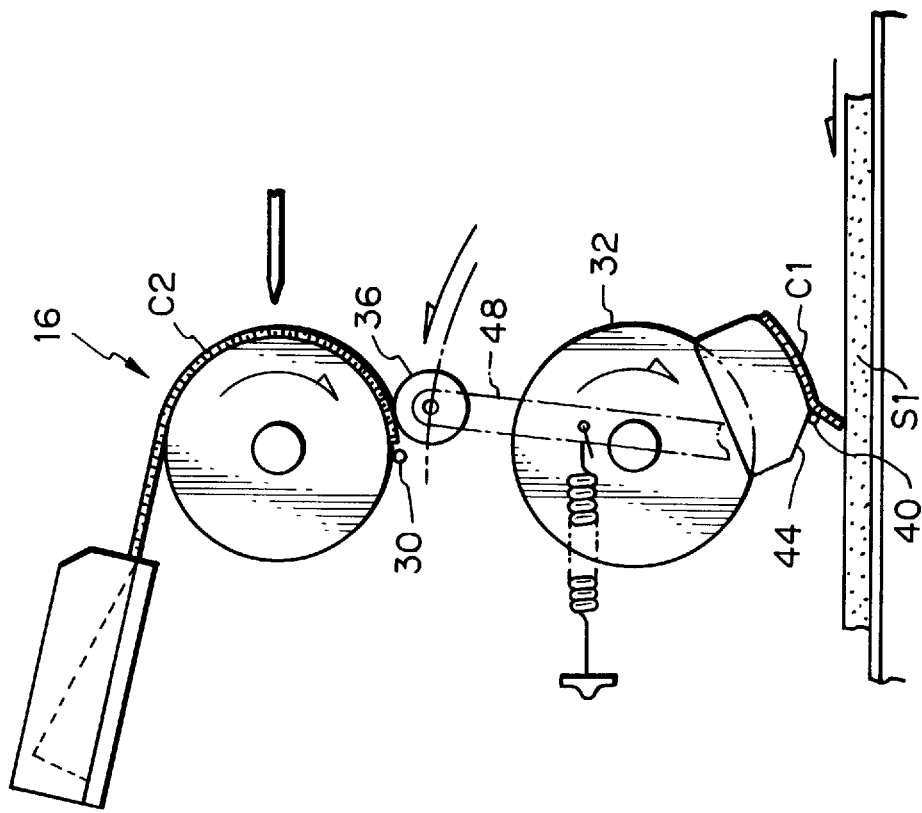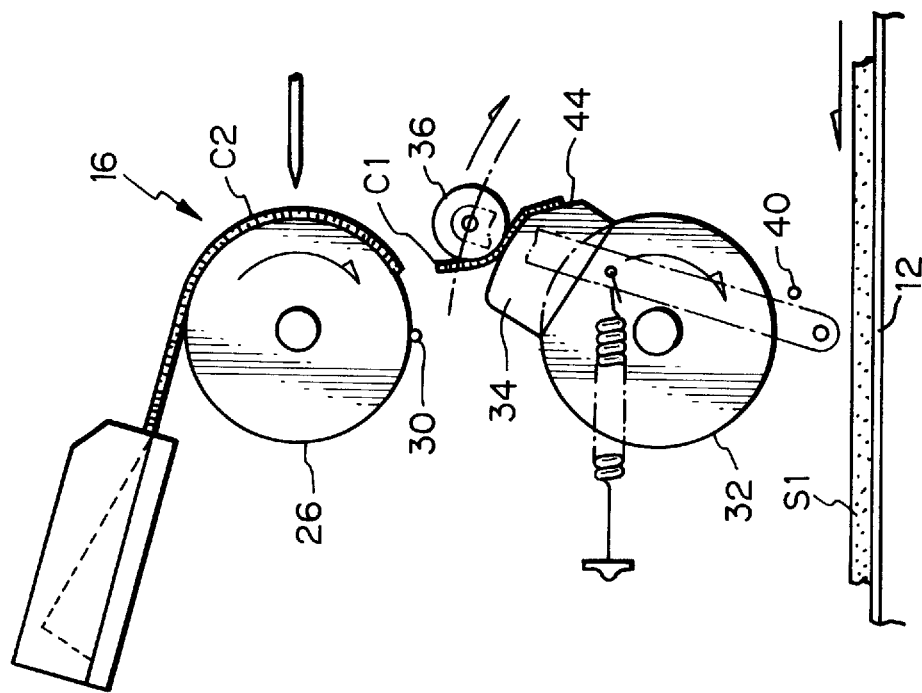

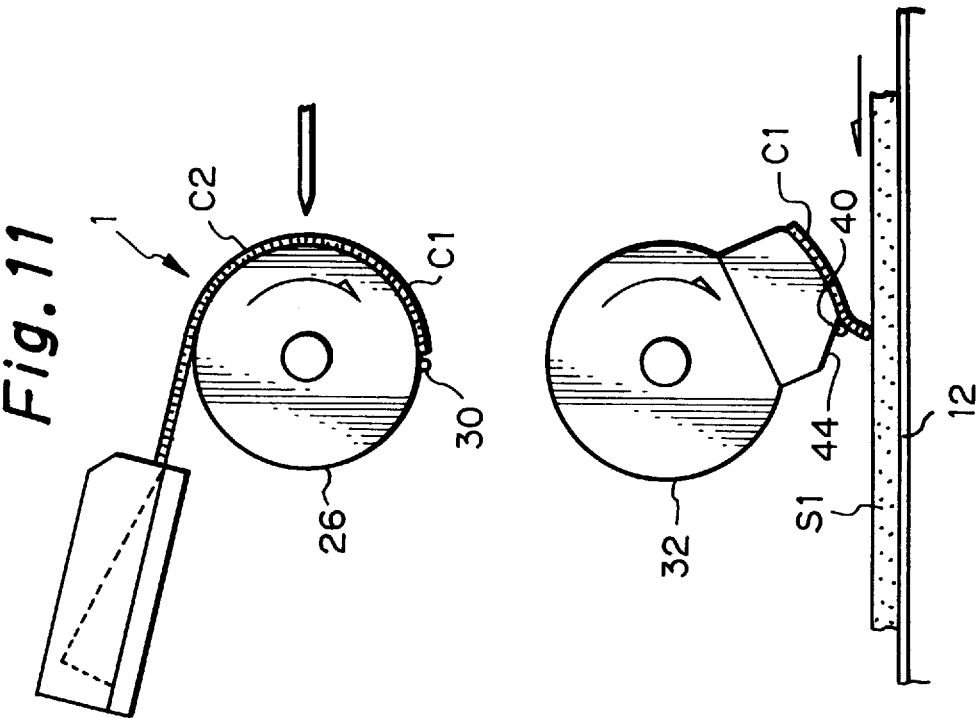
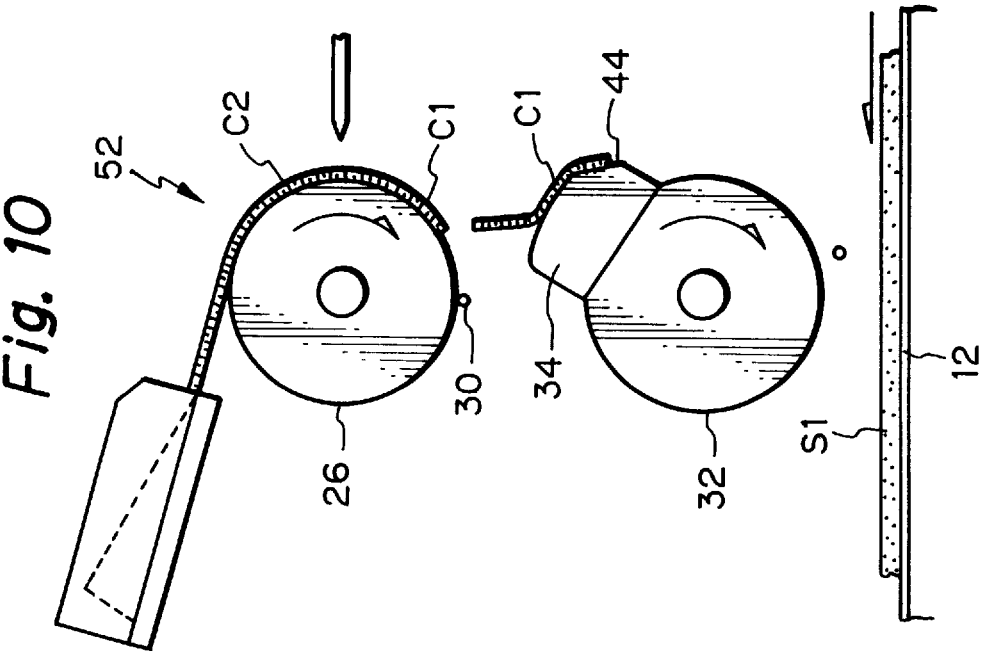

APPARATUS FOR SUPPLYING PASTE FOOD SHEETS AT A PREDETERMINED INTERVAL

BACKGROUND OF THE INVENTION

This invention relates to an apparatus for supplying paste food sheets at a predetermined interval, in particular, to an apparatus for forming paste food material into a continuous sheet, severing the sheet into a plurality of segments and supplying the sheet segments or sheets at a predetermined interval.

Japanese Published Patent Application No. 6-14832 discloses an apparatus for supplying food paste sheets at a predetermined interval, including a nozzle for shaping paste food into an elongated or continuous sheet, a first horizontal roller adapted to be rotated to receive the continuous sheet of food paste, cutter means for cutting the sheet received on the circumferential surface of the first roller at a predetermined interval, first peeler means for peeling off the cut sheet segments from the first roller, a second horizontal roller provided under the first roller and adapted to be rotated at a speed greater than that of the first roller to receive the sheet segments peeled from the first roller on the circumferential surface thereof in such a manner that the sheet segments are spaced from each other and second peeler means for peeling off the sheet segments from the second roller to supply them at a predetermined interval.

However, the apparatus stated above gives rise to a problem in that the sheet segments supplied on the circumferential surface of the second roller are prone to be displaced from their regular position, and thus it is difficult to supply them from the second roller at an accurate interval.

SUMMARY OF THE INVENTION

Accordingly, it is an object of this invention to provide an apparatus which enables such sheets or sheet segments to be delivered at a predetermined interval accurately.

This invention provides an apparatus for supplying food paste material sheets of a predetermined length at a predetermined interval on a surface moving at a predetermined speed. The apparatus includes a first roller having an axis which is substantially horizontally set and adapted to be rotated to receive a continuous food paste material sheet on the circumferential surface thereof; means for severing the continuous food paste material sheet on the circumferential surface at a predetermined interval into a plurality of sheet segments; a first peeler means provided at a predetermined position on the lower half portion of the circumferential surface of the first roller for peeling off the severed sheet segments gradually from the leading edges of the same from the circumferential surface which segments have been successively brought to the predetermined position; and a second roller provided under the first roller and having a horizontal axis. The second roller is adapted to be rotated to sequentially receive the sheet segments successively peeled off from the circumferential surface of the first roller. The apparatus further includes a second peeler means for successively peeling off the sheet segments from the second roller to supply them onto the above-noted moving surface. The second roller includes means provided on the circumferential surface thereof for receiving a leading portion of each of the sheet segments which has moved vertically down from the circumferential surface of the first roller so as to position and hold the leading portion on the circumferential surface of the second roller in the circumferential direction. The second roller further includes surface means on the circumferential surface of the second roller for receiving a portion of each of the sheet segments following the leading portion of the same. The rotational speeds of the positioning and holding means and the surface means about the axis of the second roller are substantially equal to the predetermined speed of the above-noted moving surface and greater than the circumferential speed of the first roller so that the sheet segments received on the circumferential surface of the second roller are separated from each other at the predetermined interval at which the sheet segments or the sheets of the predetermined length as noted above are supplied onto the moving surface.

In a preferred embodiment, the second roller includes sheet segment holding means provided on the circumferential surface thereof. The holding means has a radially outer surface adapted to receive and hold said sheet segment including a leading portion which inclines radially inwardly as it approaches the leading edge thereof so that the inclined leading portion functions as the above-noted positioning and holding means and the remaining portion of the outer surface succeeding the inclined leading portion functions as the above-noted surface means. The apparatus further includes an auxiliary roller having a horizontal axis and adapted to be rotatably engaged with the outer surface of the sheet segment received on the second roller to press the sheet segment against the second roller, whereby the segment is prevented from accidentally peeling off from the second roller. The auxiliary roller is arranged near the first peeler means and upstream of the same in the direction of rotation of the first roller and adapted to be moved from the position as arranged above by engagement thereof with the outer surface of the sheet segment on the second roller in rotation and to return to the above-noted arranged position after the auxiliary roller disengages from the outer surface of the sheet segment.

The foregoing and other objects of this invention will become clear from the following detailed description of preferred embodiments when taken in conjunction with the accompanying drawings.

BRIEF DESCRIPTION OF THE DRAWINGS

FIGS. 3–7 are side elevation views of the food paste sheet supply apparatus of FIG. 2 showing an operation thereof;

FIGS. 8–11 are side elevation views of a food paste sheet supply apparatus in accordance with a second embodiment of this invention showing an operation thereof.

DETAILED DESCRIPTION OF THE INVENTION

Figure 1:
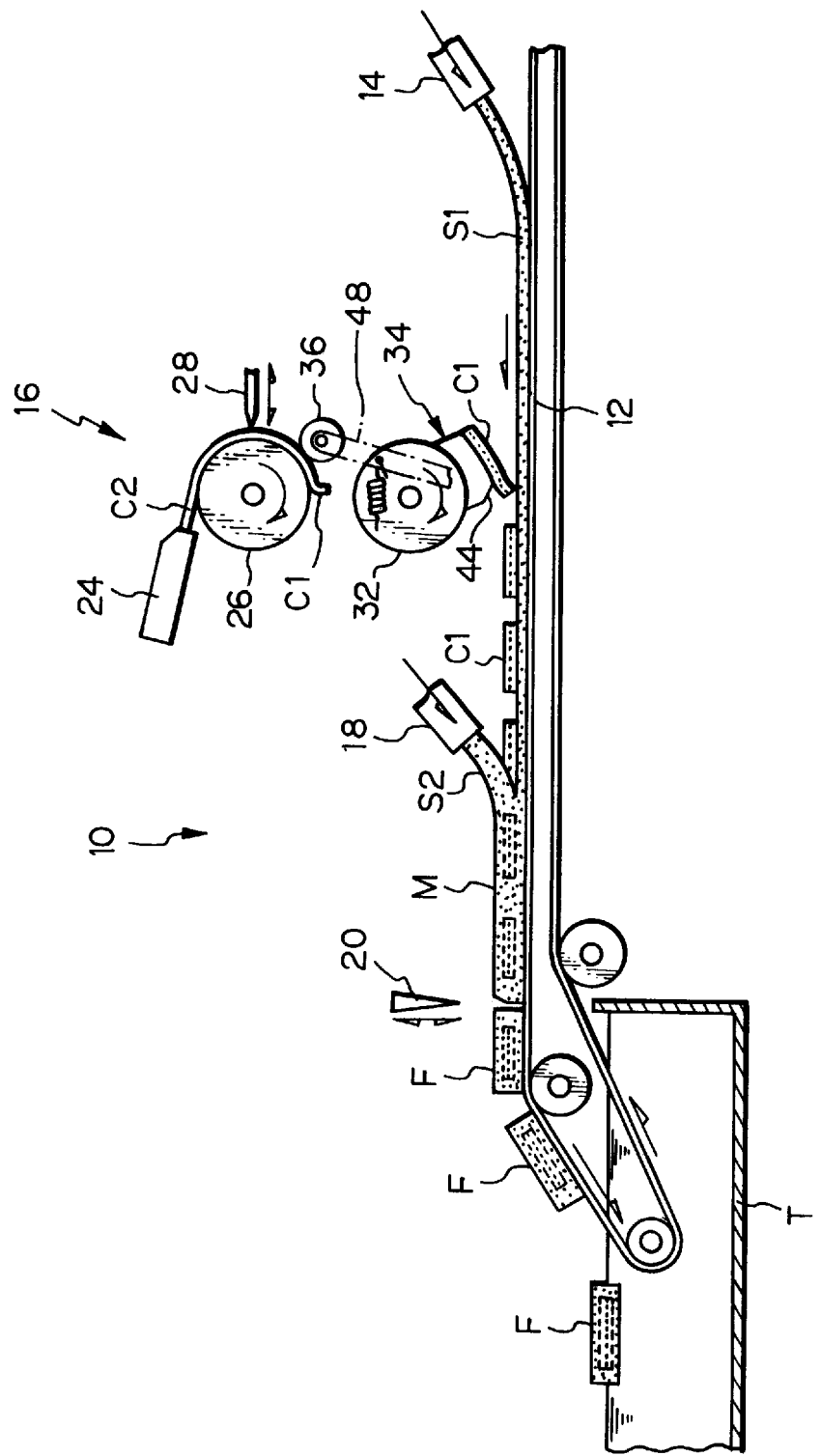
FIG. 1 is a schematic side elevation view of a multiply food production apparatus in which a food paste sheet supply apparatus in accordance with a first embodiment of this invention is incorporated.

FIG. 1 shows an apparatus 10 for producing multiply food F including three piled sheets. The apparatus includes an endless belt conveyor 12, a first nozzle 14 for forming a first continuous fish paste sheet S1 and supplying it onto the conveyor, an apparatus 16 for supplying rectangular cheese sheets C1 onto the first continuous fish paste sheet C1 at a predetermined interval, a second nozzle 18 for forming a second continuous fish paste sheet S2 onto the first continuous fish paste sheet S2 with the rectangular cheese sheets C1, a cutter 20 for cutting the thus-formed continuous paste food material M into a plurality of segments or above-stated multiply food F which each includes one of the rectangular cheese sheets and a hot water tank T adapted to receive the food segments F from the conveyor and subject them to heating process to produce final food products.

Figure 2:
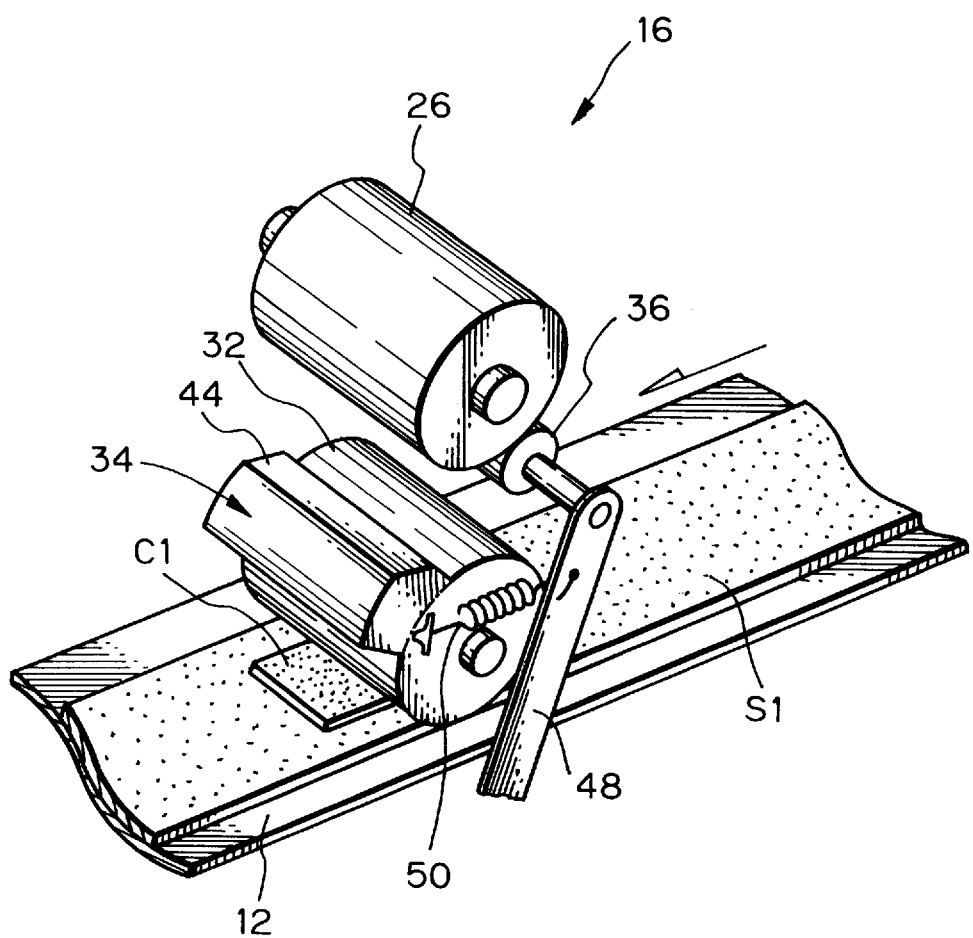
FIG. 2 is a perspective partial view of the apparatus of FIG. 1 to mainly show the food paste sheet supply apparatus.

As shown in FIGS. 1 and 2, the apparatus 16 includes a nozzle 24 for forming and supplying a continuous cheese sheet C2, a first roller 26 having a horizontal axis and adapted to be rotated to receive the continuous cheese sheet C2, a cutter 28 having a horizontal cutting edge and adapted to cut the continuous cheese sheet C2 at a predetermined interval in the longitudinal direction of the sheet or in the circumferential direction of the first roller to thereby form a plurality of rectangular cheese sheets C1, a first peeler or horizontal piano wire 30 (FIG. 3) engaged with the circumferential surface of the roller 16 for peeling off the rectangular cheese sheets C1 gradually from the leading edge thereof from the first roller and a second roller 32 horizontally provided under the first roller. The second roller 32 is provided with a rectangular cheese sheet holding member 34 on the circumferential surface thereof which is adapted to receive one of the rectangular cheese sheets C1 on the radially outer surface thereof. The apparatus further includes an auxiliary roller 36 adapted to be rotatably engaged with the outer surface of the cheese paste sheet C1 on the cheese sheet holding member 34 to press the rectangular cheese sheet against the radially outer surface of the cheese sheet holding member 34 and a second peeler or horizontal piano wire 40 (FIG. 3) adapted to peel off the cheese segment from the radially outer surface of the cheese sheet holding member 34.

As shown in FIGS. 3–7, the radially outer surface of the cheese sheet holding member 34 includes an inclined leading portion 44 which is inclined radially inwardly as it approaches the leading edge thereof and functions as a means for receiving and holding the leading portion of the rectangular cheese sheet C1 (FIG. 4) and an arch surface portion 46 succeeding the leading portion 44 having a radius centering the axis of the second roller 32 and adapted to receive the remaining portion of the rectangular cheese sheet succeeding the leading edge portion of the same held by the inclined leading portion of the radially outer surface of the holding member 34 (FIG. 5).

The auxiliary roller 36 is provided on the top end of an arm 48 which is pivotably mounted on an apparatus frame (not shown) at the point under the second roller 32 and arranged to be usually set at the position shown in FIG. 3. In this position, the circumferential surface of the auxiliary roller 36 is near to but spaced from the circumferential surface of the first roller 26 to allow the rectangular cheese sheets C1 on the latter surface to pass between these surfaces toward the first peeler or horizontal piano wire 30 and is positioned where the inclined leading portion 44 of the radially outer surface of the cheese sheet holding member 34 passes. The arm 48 is biased by a spring 50 in a counterclockwise direction and stopped by a stopper (not shown) such that the auxiliary roller 36 is positioned at the above-stated usual position.

Figure 7:
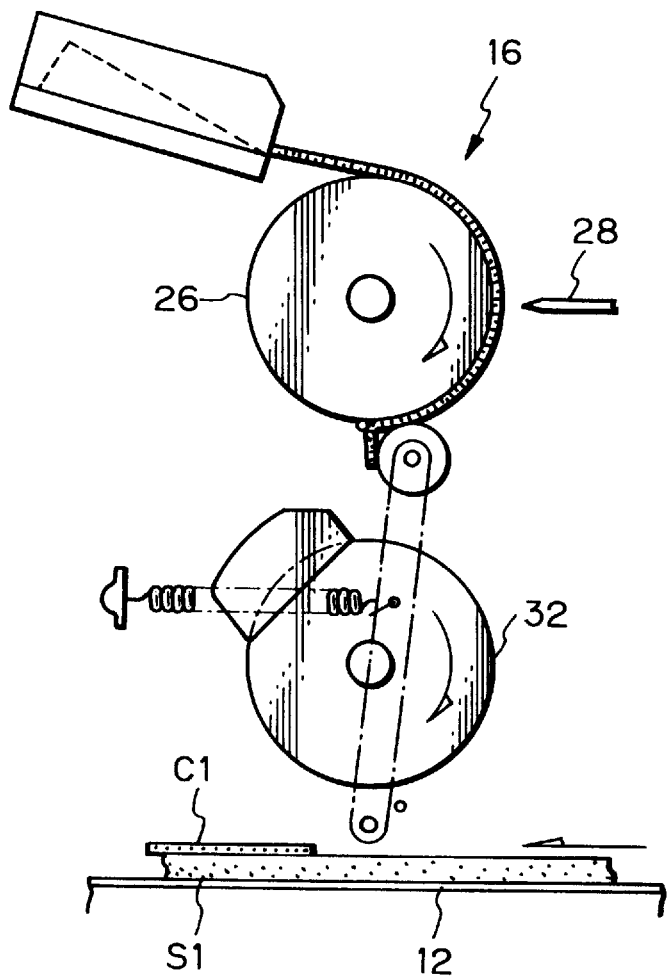
Figure 9:
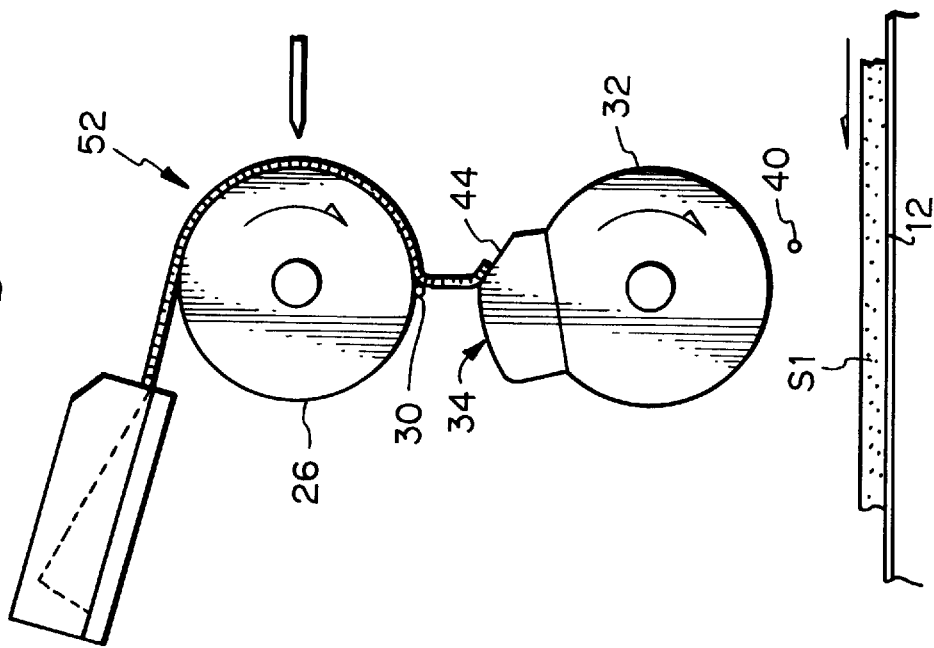
Figure 8:
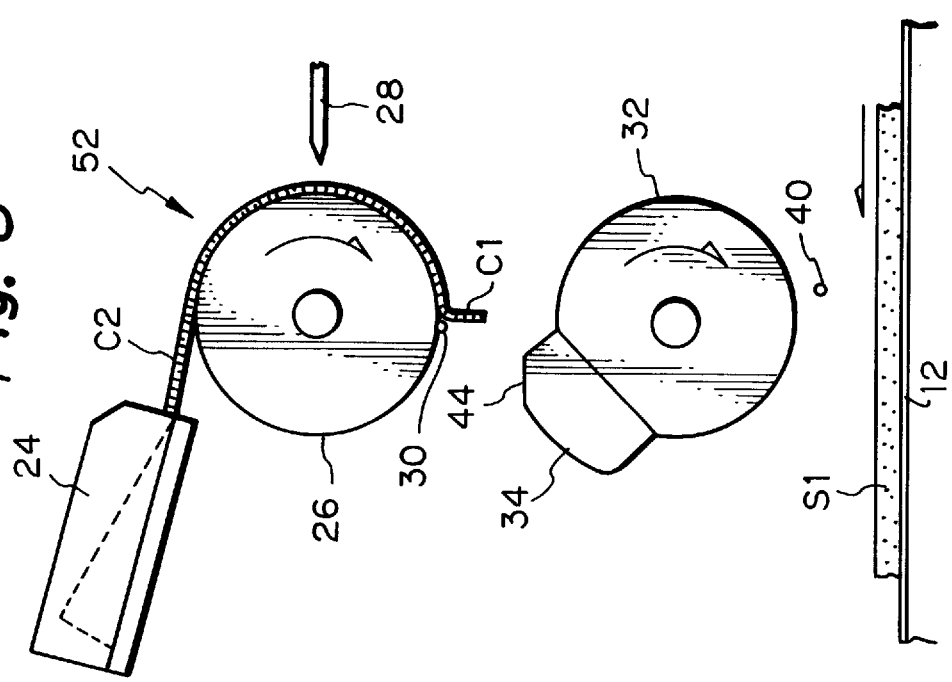

As shown in FIG. 3, the rectangular cheese sheet C1 which has reached the first peeler 30 is peeled off by the peeler from the circumferential surface of the first roller 26 and moves vertically down toward the second roller 32. The second roller is rotated at a speed greater than that of the first roller such that each revolution of the second roller enables the second roller to receive a single rectangular cheese sheet C1 from the first roller 26 and to transfer it onto the first continuous fish paste sheet S1. The leading portion of the rectangular cheese sheet C1 moving down from the first roller 26 is engaged and held by the inclined leading portion 44 of the radially outer surface of the rectangular cheese sheet holding means 34 (FIG. 4) and the remaining portion of the rectangular cheese sheet C1 succeeding the leading portion of the sheet is received by the portion 46 of the radially outer surface succeeding the inclined leading portion 44 of the same. The auxiliary roller 36 rotatably engages with the rectangular cheese sheet held on the holding member 34 to press the sheet against the radially outer surface of the holding member 34 to thereby prevent the cheese sheet from accidentally peeling off from the surface. Due to the positional difference between the center of rotation of the holding member and the pivotal pin of the arm 48, the auxiliary roller 36 is pivoted in a clockwise direction by the engagement with the radially outer surface of the holding member 34 or the rectangular cheese sheet hereon against the bias force of the spring 50 and, upon disengagement of the auxiliary roller 36 from the radially outer surface of the holding member, the roller is returned to its usual position by the spring 50 as shown in FIG. 6. The second peeler or horizontal piano wire 40 is positioned under the second roller near the endless conveyor 12 where the outer surface of the rectangular cheese sheet holding member 34 passes so that the rectangular cheese sheet C1 held on the outer surface of the holding member 34 and brought to the wire is peeled off gradually from the leading edge thereof from the outer surface of the holding member by the wire and received by the first continuous fish paste sheet S1 conveyed by the endless conveyor which is driven at the same speed as the speed of the rectangular cheese sheet held on the holding member 34 (FIGS. 6 and 7).

Accordingly, the rectangular cheese sheets or sheet segments supplied on the continuous fish paste sheet are spaced from each other at regular intervals.

FIGS. 8–11 show a food paste sheet supply apparatus 52 in accordance with the second embodiment of this invention. As shown, the apparatus of this embodiment is substantially the same as that of the first embodiment except that the former apparatus does not include the auxiliary roller 36 as provided in the latter apparatus. The apparatus of this embodiment is suitable for use when the cheese paste used to form cheese paste sheets or sheet segments as stated above has viscosity enough to attach to the surface of the cheese sheet holding member 34 by itself.

What is claimed is:

1. An apparatus for supplying food paste material sheets of a predetermined length at a predetermined interval on a surface moving at a predetermined speed, said apparatus including:

a first roller having an axis which is substantially horizontally set and adapted to be rotated to receive a continuous or elongated food paste material sheet on the circumferential surface thereof;

a means for severing said continuous food paste material sheet on said circumferential surface at a predetermined interval in the circumferential direction into a plurality of sheet segments or said sheets of said predetermined length;

a first peeler means provided at a predetermined position on the lower half portion of said circumferential surface of said first roller for peeling off said severed sheet segments gradually from the leading edges of the same from said circumferential surface which segments have been successively brought to said predetermined position;

a second roller provided under said first roller and having an axis parallel to said axis of said first roller, said second roller being adapted to be rotated to sequentially receive said sheet segments successively peeled off from said circumferential surface of said first roller; and, a second peeler means for successively peeling off said sheet segments from said circumferential surface of said second roller to supply them onto said moving surface, said second roller including means provided on the circumferential surface thereof for receiving a leading portion of each of said sheet segments which has moved vertically down from said circumferential surface of said first roller so as to position and hold said leading portion on the circumferential surface of said second roller in the circumferential direction, said second roller further including surface means on said circumferential surface of said second roller for receiving a portion of each of said sheet segments following said leading portion of the same, the rotational speeds of said positioning and holding means and said surface means about the axis of said second roller are substantially equal to said predetermined speed of said moving surface and greater than the circumferential speed of said first roller so that said sheet segments received on said circumferential surface of said second roller are separated from each other at said predetermined interval at which said sheet segments or said sheets of said predetermined length are supplied onto said moving surface.

2. An apparatus as set forth in claim 1 wherein said second roller includes sheet segment holding means provided on said circumferential surface thereof and having a radially outer surface adapted to receive and hold said sheet segment, a leading portion of said radially outer surface inclined radially inwardly as it approaches the leading edge thereof so that the inclined leading portion functions as said positioning and holding means and the portion of said radially outer surface succeeding said inclined leading portion functions as said surface means.

3. An apparatus as set forth in claim 1 further including an auxiliary roller having a horizontal axis and adapted to be rotatably engaged with said outer surface of said sheet segment received on said second roller to press the sheet segment against the second roller, whereby the segment is prevented from accidentally peeling off from the second roller.

4. An apparatus as set forth in claim 3 wherein said auxiliary roller is arranged near said first peeler means and upstream of the same in the direction of rotation of said first roller and adapted to be moved from the position as arranged above by engagement thereof with the outer surface of said sheet segment on said second roller in rotation and to return to said arranged position after the auxiliary roller disengages from said outer surface of said sheet segment.

5. An apparatus as set forth in claim 2 further including an auxiliary roller having a horizontal axis and adapted to be rotatably engaged with said outer surface of said sheet segment received on said second roller to press the sheet segment against the second roller, whereby the segment is prevented from accidentally peeling off from the second roller.

6. An apparatus as set forth in claim 5 wherein said auxiliary roller is arranged near said first peeler means and upstream of the same in the direction of rotation of said first roller and adapted to be moved from the position as arranged above by engagement thereof with the outer surface of said sheet segment on said second roller in rotation and to return to said arranged position after the auxiliary roller disengages from said outer surface of said sheet segment.

* * * * *